J. E. PEAVEY.
DRY CELL ELECTRIC BATTERY.
APPLICATION FILED MAR. 15, 1919.
1,389,691. Patented Sept. 6, 1921.
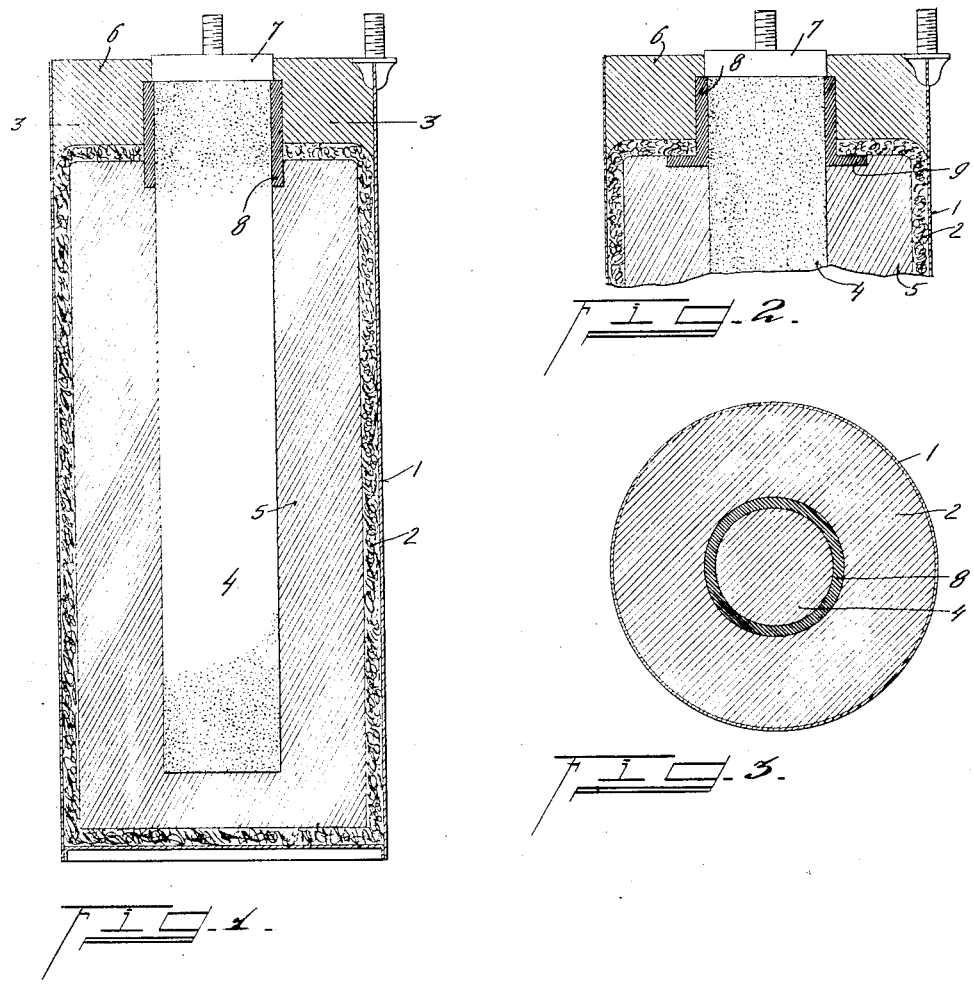

UNITED STATES PATENT OFFICE.

JAMES E. PEAVEY, OF CINCINNATI, OHIO.

DRY-CELL ELECTRIC BATTERY.

1,389,691.   Specification of Letters Patent.   Patented Sept. 6, 1921.

Application filed March 15, 1919. Serial No. 282,907.

*To all whom it may concern:*

Be it known that I, JAMES E. PEAVEY, a citizen of the United States, and residing at Cincinnati, in the county of Hamilton and State of Ohio, have invented a new and useful Improvement in Dry-Cell Electric Batteries, of which the following specification is a full disclosure.

My invention relates to an improvement in electric dry cell batteries of the standard type of construction.

The invention has for an object the provision of means for preventing a short circuiting of the electric current through an absorbent packing disposed between the anode forming the outside casing of the cell and the electrode.

Further objects and advantages of the invention will be more fully set forth in the description of the accompanying drawings forming a part of this specification and in the drawings like characters of reference denote corresponding parts throughout the several views, in which:

Figure 1 is central vertical section through the cell or dry battery of standard type of construction, containing my improvements.

Fig. 2 is central vertical section of the upper portion of a dry battery cell illustrating a modified construction of the form shown in Fig. 1.

Fig. 3 is a section on line 3, 3, Fig. 1.

Referring to Figs. 1 and 2, in which the general construction of the cell represents a standard type consisting of a metal casing 1 forming the anode of the battery, having a casing lining 2 within and adjacent the sides and base of the casing, of a heavy fibrous absorbent material or paper stock. A central carbon electrode 4 is surrounded by an electrolyte compound 5 compressed between the electrode and casing lining.

In the manufacture of the battery, after the cell has been filled to a proper height, the upper end of the absorbent casing lining 2 is turned and compressed inwardly over the electrolyte compound. The electrolyte compound is moist when filled into the cell and thoroughly tamped and compressed into the cell. The tamping process causes an excess of moisture to accummulate at the upper portion thereof, which is absorbed by the bent over lining portion and thus retained within the cell after the open end of the cell is sealed by a wax or pitch cover 6 which is poured hot into the open end of the cell over a layer of grit usually covering the bent over or lapped portion of the lining.

It is also customary to previously treat the upper end of the electrode, before it is inserted into the cell, with a chemically inert material, such as paraffin, by immersing the end into a hot bath of such material. This prevents the fluid from the electrolyte permeating upwardly toward and corroding the metallic terminal 7 headed into the electrode.

The casing lining, after it has been lapped and compressed over the electrolyte filler under the ordinary methods of manufacture, contacts around the electrode, connecting the anode casing and electrode.

This cross absorbent layer of the lining, being saturated with moisture, has been found by test, for a gap width between the anode and electrode in a dry cell, to be capable of transmitting an electric current, establishing a partial short circuit across the positive and negative electrodes and due to its current-carrying capacity causes an early deterioration of the battery without active use and a disintegration of the cell casing by electrolyzing around its circumference at a point where the lining is folded inward over the electrolyte.

It has also been found that the conductivity of this lining lap is increased with the age of the battery through its absorption of the electrolyte salts.

To prevent such internal short-circuiting of the battery electrodes, I provide the electrode 4 with a non-absorbent insulator collar or ferrule 8 as a protecting covering to prevent the cell lining from being compressed in direct contact with the electrode. The insulator may be either as a straight sleeve, as shown in Fig. 1, slipped over the top of the electrode after the electrolyte filler has been filled and compressed into the cell, with the lower end of the sleeve slightly embedded into the filler to bring it below the plane of the filler or point below which the lining lap will not be compressed when folded over, or the insulator may be in the nature of a viscous, non-absorbent material applied or molded around the electrode to provide a jacket or insulating coating, or it may be made of paper or pulp, as a sleeve, treated to render it non-absorbent and as a non-conductor of an electric current slipped over the end of the electrode. The sealing pitch 6 completely covers and embeds the insulator ferrule, and thereby does not increase the joint surface to which the pitch adheres over the commercial form of dry battery cells. The insulator ferrule may therefore be loosely slipped upon the end of the electrode after the cell has been filled with electrolyte.

In Fig. 2, I have shown the insulator as a flanged ferrule. the flange 9 thereof projecting laterally and annularly beneath the end of the lining lap as an additional means to avoid the lining coming in contact with the electrode when folding over the lap of the lining.

I claim:

In a dry cell electric battery, a metallic casing providing a container and battery anode, a cathode electrode centrally disposed within said casing, an absorbent inner lining for said casing having its upper end folded inwardly about the electrode providing an end covering for the battery electrolyte, a non-absorbent electrical insulated sleeve around said electrode protecting the electrode from contact with the edges of the folded portion of said lining, and embedded within pitch sealing the end of the battery casing.

In witness whereof, I hereunto subscribe my name, as attested by the two subscribing witnesses.

JAMES E. PEAVEY.

Witnesses:
L. A. BECK,
CLARENCE B. FOSTER.